Figure 1:
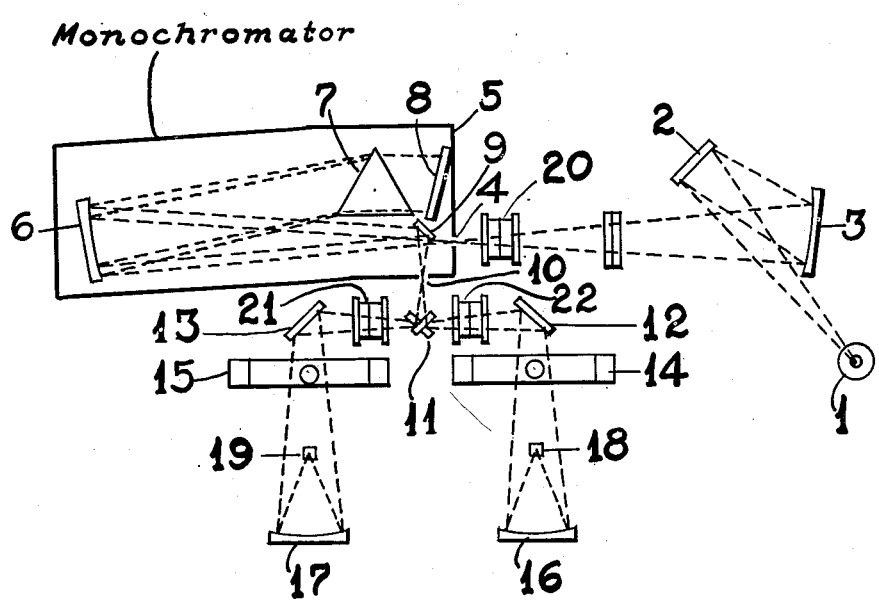

Dec. 2, 1952      J. J. HEIGL ET AL      2,620,444
PROCESS AND APPARATUS FOR ABSORPTION SPECTROMETRY

Filed Dec. 31, 1948      2 SHEETS—SHEET 1

FIGURE—1

Patented Dec. 2, 1952

2,620,444

UNITED STATES PATENT OFFICE 2,620,444

PROCESS AND APPARATUS FOR ABSORPTION SPECTROMETRY

John J. Heigl, Cranford, and John A. Hinlicky, Irvington, N. J., assignors to Standard Oil Development Company, a corporation of Delaware Application December 31, 1948, Serial No. 68,585

4 Claims. (Cl. 250—43.5)

This invention relates to an improved process and apparatus for use in the field of absorption spectrometry. In particular, the invention consists of an improved method of absorption spectrometry utilizing a selected band of radiation and utilizing a particular system of dual radiation detectors.

At the present time, in chemical and petroleum operations, it is becoming increasingly prevalent to conduct operations as continuous processes rather than as batch processes. The advantages of continuous processes over batch processes are well known. One of the most difficult problems involved in adapting particular batch processes to continuous operation is the difficulty of suitably controlling the processes. In certain operations, streams of reactants are brought together in a reaction chamber under critical reaction conditions and the reaction products are withdrawn at high rates of fluid flow. In such processes it is generally extremely important, or essential, for efficient operation to have means for closely following and controlling the continuous process and it is frequently necessary to know both the composition of the reactants and of the reaction products. Ordinarily it is simple enough to determine the composition of the reactants as this may be done at any time prior to introduction to the reaction chamber. However, a more difficult problem is generally encountered in determining the composition of the reaction products. Clearly reaction products flowing from a reaction chamber at high velocities cannot be subjected to long and difficult analytical procedures if the operation of the process depends upon an immediate and continuous knowledge of their composition. Consequently, the need is greatly felt at the present time for analytical procedures which may be conducted in an extremely short period of time. At the same time, there exists a need for rapid analytical procedures which may be conducted and recorded continuously. It is therefore the principal purpose of this invention to provide apparatus and procedure of this character suitable for rapidly and continuously analyzing a single constituent in a liquid or gaseous mixture. The constituent being analyzed, hereafter referred to as the "key component," serves as an index of the efficiency of operation of the process from which the constituent is derived. If it is desired to analyze for more than one key component, several instruments may be used, each one being used to detect one key component.

It has long been appreciated that a possible means for attaining the objectives of this invention is to subject multicomponent streams to a beam of suitable radiation, enabling the determination of the composition of the stream by the nature of the radiation absorbed or transmitted. For example, gas analyzers are known to the art which pass a beam of infrared radiation through a gas sample. With particular gas constituents in the stream it is possible to learn the composition of the stream by determining how opaque the gas stream is. Thus, if a gas stream consists only of the gases nitrogen and carbon dioxide, by means known to the art, it is relatively simple to subject the stream to the infrared analysis procedure referred to in order to determine the percentage of carbon dioxide present. This procedure is simple by virtue of the fact that nitrogen is transparent to infrared radiation so that the opacity of the gas stream will be purely a function of the amount of carbon dioxide present. In attempting to extend this analytical method to more complicated gas or liquid streams, difficulties are encountered however. For example, if the stream contains several constituents which are opaque to infrared radiation, it is extremely difficult to distinguish between these constituents by this general method.

As indicated, the present methods for analyzing a particular component in a mixture of components by absorption spectrometry are relatively complicated and difficult. As an example, this may be accomplished by known methods of spectrometry using a monochromatic beam of radiation. According to a conventional procedure, the first step is to determine the characteristic absorption spectrum of each of the components of the system to be analyzed. The second step is to then select particular bands of radiation for each of the components, each of which bands is relatively free of interference from the bands of the other components. The third step of the analytical operation is to measure the band intensities and to derive a series of linear simultaneous equations which are solved in terms of the percentage of the individual components. An unknown mixture can then be analyzed by measuring the intensity of absorption at the selected wave length bands, substituting the values thus obtained into the linear simultaneous equations derived as indicated above.

It is apparent from the foregoing description that the methods of analysis known to the art for identifying a particular constituent in a mixture are fairly complicated and require a comparatively long and tedious analytical procedure.

This procedure is particularly characterized by the necessity of analyzing each constituent of a system in order to determine only one of the constituents. It is also a practical limitation of the type of analysis heretofore indicated that the accuracy of the analysis is limited, particularly because some drift of the instrument may occur during the period between the initial analytical steps and the final analysis step. It is therefore a principal object of this invention to overcome these difficulties of conventional analytical procedures.

More particularly, it is an object of this invention to provide analytical apparatus and procedure suitable for indicating the percentage of a particular component of a mixed system without the necessity for analyzing the other components. For example, in the analysis of a mixture of hydrocarbons for one hydrocarbon constituent, employing conventional methods of absorption spectrometry, it is generally impossible to determine the desired constituent without carefully eliminating the interference caused by the ascertained proportions of the other constituents. This invention makes it possible to determine the desired single constituent in a mixture without regard for the amounts or variation in amounts of the constituents of the mixture.

A second, more specific object of this invention is to enable the absorption spectrometric analysis of one component in a mixture of components with an accuracy hitherto not obtainable. In general, the accuracy of the analytical methods known to the art is approximately plus or minus 1.0% unless extreme precautions are taken. The process and apparatus of this invention, on the other hand, is capable of accuracies in the range of plus or minus 0.1%.

The last object of this invention to be particularly noted, is to enable the successful indentification of comparatively small traces of one component in a mixture. Thus for example, it is possible in the practice of this invention to determine as little as 0.1% of iso octane in a mixture of normal heptane and methyl cyclopentane.

The basic components of the analytical apparatus of this invention consists of a source of radiation, a monochromator, two light intensity detectors connected in opposition to a voltage measuring device, and suitable cells and light intensity adjusters. The source of radiation employed may be any desired source chosen to emit radiation of a desired wave length; for example, the source may consist of an infrared source, an ultra violet source, or an X-ray source. The radiation emitted by the source is caused to enter the monochromator and to exit therefrom in a manner to supply a selected band of radiant energy. This radiant energy may then be passed through a sample cell containing the mixture of components to be analyzed. Thereafter the radiation is passed through a radiation splitting means for separating the beam into two beams of radiation, each of which is caused to pass through radiation intensity control means and thence to suitable radiation detectors. In addition to this basic apparatus as described, it is necessary to employ certain additional cells which may be called filter cells. It is necessary to employ at least one filter cell and often two filter cells, each of which is to be positioned in one of the two beams of radiation indicated above. It is also possible to refine the type of apparatus indicated in many ways; as for example, by critically adjusting the thickness of the sample cell or by utilization of what may be called an interference cell to be placed in the path of the radiation either before or after the radiation passes through the sample cell. For the purpose of simplicity, the description of the apparatus and procedure of this invention will be directed to a simplified diagrammatic drawing of the basic apparatus to be used in the practice of this invention. As indicated, however, it is to be understood that this apparatus may be modified in many ways known to the art.

Figure 2:
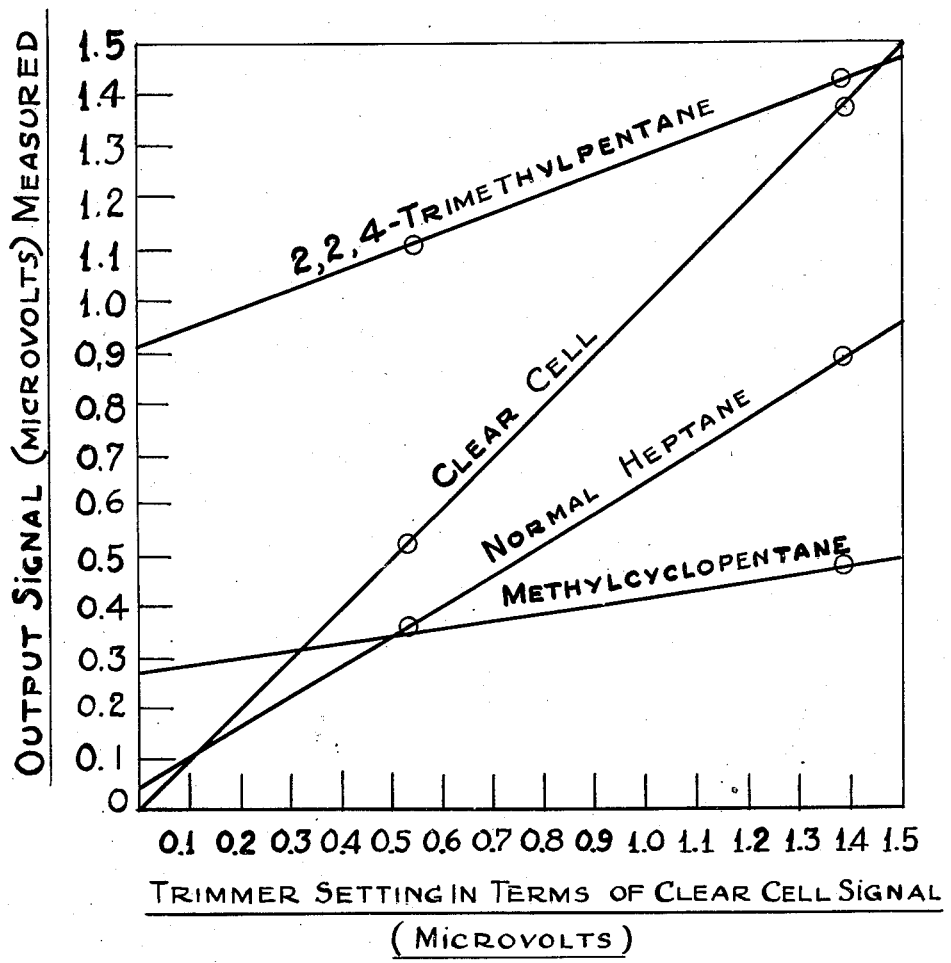

Illustrated in Figure 1 of the attached drawings is a schematic illustration of apparatus embodying the basic principles of this invention; and illustrated in Figure 2 is a plot of light intensity adjustments of the two beams of light provided by the apparatus of Figure 1, plotted against the differential output signal of the dual detectors as obtained in analyzing a typical mixture.

Referring to Figure 1, the numeral 1 designates a suitable source of light energy. For example, a suitable source of infrared light energy may be a globar light source or a Nernst light source. As shown by the dashed lines, energy from the source 1 is transmitted towards a reflecting mirror 2 from which the light is directed to a spherical mirror 3; the spherical mirror causes the light to converge to a line positioned at the entrance slit 4 of the monochromator generally indicated by the dashed-line rectangle 5. The light passing the entrance slit 4 then is reflected from the spherical mirror 6 which collimates the light through prism 7 to form dispersed light. The dispersed light coming through the prism 7 is then reflected from mirror 8 back through the prism 7 to be reflected by the spherical mirror 6 and by means of mirror 9 through the exit slit 10 of the monochromator. The positioning of the elements of the monochromator described are selected so that light from the mirror 9 is substantially focused in a line at the exit slit 10. By this means it is possible to cause a desired band of light energy to be emitted from the exit slit 10. The selection of the nature of light emitted from the exit slit 10 of the monochromator may be readily accomplished by critical adjustment of the elements illustrated. Thus the rotation of mirror 9 on a vertical axis will control the wave length of light passing through the exit slit. Similarly the band width of this light energy may be adjusted by controlling the width of the entrance slit 4 and the width of the exit slit 10 of the monochromator. In practice, these are coupled so that simultaneous adjustment of the width of the entrance and exit slits is possible. The particular wave length of energy to be utilized emitting from the exit slit 10 and the particular band width of this energy may be varied, depending upon the particular analytical procedure concerned. As an example, however, it may be noted that in a typical analysis of 2,2,4 trimethyl pentane in normal heptane - methylcyclopentane mixtures using infrared energy, it was found suitable to employ a wave length interval of 7.9 to 8.7 microns.

Energy of suitable wave length and suitable spectral band width is therefore passed through the exit slit 10 of the monochromator to fall on a light splitting means 11. As illustrated, a suitable light splitter which may be utilized, consists of 2 mirrors positioned one above the other at an angle of 90° with respect to each other. Light falling upon these mirrors is caused to travel in the two paths indicated by the dotted lines in directions toward the mirrors 12 and 13. Each of these beams of light is then reflected from the mirrors 12 and 13 so as to pass through the radiation intensity controls 14 and 15 to be reflected from the mirrors 16 and 17 to the light intensity detectors 18 and 19. The light intensity controls, 14 and 15, may consist of suitable assemblies to adjustably interpose an opaque object in each beam of light so as to control the amount of light passing through the light intensity controls and reaching the mirrors 16 and 17 and the energy intensity detectors 18 and 19. The mirrors 16 and 17 as illustrated are preferably spherical mirrors adapted to concentrate the light energy on the detectors 18 and 19. The detectors 18 and 19 are connected in opposition so that the difference in their output may be amplified to be indicated or recorded by conventional means. As the method of amplifying and recording the output of the detectors 18 and 19 is not a part of this invention, these elements of the apparatus have not been illustrated. It is to be understood that the detectors 18 and 19 may be any desired type of light intensity detectors such as thermocouples or bolometers.

In using the apparatus heretofore generally described, a suitable sample cell 20 is interposed in the path of the radiation at any point prior to the splitting of this radiation by the light splitting means 11. Filter cells 21 and 22 are positioned in each of the beams of light provided by the light splitting means 11, for example between light splitting means 11 and mirrors 12 and 13 as illustrated.

In accordance with the analytical procedure of this invention, a multi-constituent fluid sample is passed through the sample cell 20 of Figure 1 in the type of apparatus described. Certain fluids are then placed in the filter cells 21 and 22 of such a nature as to cause the instrument to be sensitive to the particular constituent it is desired to analyze. The monochromator is then adjusted so as to provide energy of a desired wave length and spectral band width. The light intensity controls indicated by the numerals 14 and 15 on the drawing are then critically adjusted in such a way that the instrument will be selective to the particular constituent to be analyzed. The analytical procedure necessary may thus be considered as comprising three steps. The first step of the procedure is to adjust the monochromator so as to obtain the desired characteristics of light energy. The second step is to suitably fill the filter cells with fluids so as to sensitize the instrument to a particular key constituent. The third step is to adjust the light intensity controls to a critical setting so as to make the apparatus selective for the particular constituent to be determined. Each of the steps indicated will be described in detail so that the method of the novel analytical procedure may be fully understood.

The first step of the analytical procedure is to suitably select the wave length of the energy to be used and to select the spectral band width of this energy. It is a particular feature of this invention that a narrow selected band width of energy is employed rather than employing, for example, the total radiant energy. In order to determine the suitable energy characteristics to be used, curves are prepared showing the absorption characteristics of each of the constituents of the sample over the total band width of the radiant energy used. A spectral band width is then chosen from these curves at which point the given constituent to be determined has a maximum absorption relative to other constituents of the mixture. This step of the procedure has been based on the discovery that slight differences in the absorption characteristics of similar constituents may be magnified by choosing a narrow spectral band width at which the given constituent will be found to have a markedly different absorption than the other constituents. In general it is contemplated that the spectral band width to be utilized will be about 1 to 10 times the width of the selected band of the key component. For example in the case of infrared analyses, a suitable band width is in general about 0.2 to 2 microns.

In order to suitably sensitize the apparatus to the particular constituent which is to be determined, it is necessary to place suitable gases, or liquids in one or both of the filter cells 21 and 22. In general the method usually entails placing a sample of the pure constituent which it is desired to analyze in one of the filter cells. Thus if the particular analysis is to detect iso-octane in a mixture of hydrocarbons then iso-octane will be placed in one of the filter cells. If the desired sensitivity is not achieved by simply placing a sample of the key constituent in one of the filter cells, an essentially trial and error procedure must be used for determining the nature of the fluids to be placed in the other filter cell. In general, fluids should be used which are at least partially opaque to the energy employed in the analysis. These fluids should preferably be chosen from the constituents present in the sample to be analyzed. Thus, if it is desired to analyze the hydrocarbon mixture XABC, where X represents the hydrocarbon to be determined, pure X is first placed in one of the filter cells. If the apparatus is not sufficiently sensitized at this point then pure A may be placed in the other filter cell, and it may also be necessary to substitute pure B, or pure C in order to suitably sensitize the apparatus. In some cases it is necessary to employ particular proportions of each of the constituents other than the key constituent, or even to utilize a fluid not present in the sample to be analyzed.

The third step of the analytical procedure is to critically adjust the energy intensity controls 14 and 15. This is carried out by arbitrarily employing two settings of the light intensity controls while obtaining data as to the absorption characteristics of each of the constituents present in the sample. Thus in analyzing a sample A B C, successively, pure A, pure B and pure C will be placed in the sample cell, and the response of the instrument will be determined at two different settings of the light intensity controls. By this means it is possible to choose a critical setting of the light intensity controls which will provide maximum selectivity for the determination of the given constituents.

In addition to the above essential steps of the analytical procedure, it is also generally necessary to carefully select the sample cell thickness and the filter cell thickness in order to obtain maximum selectivity.

The nature of this invention will be better understood from a consideration of the following example. For the purposes of illustration, a hydrocarbon composition was prepared consisting of mixtures of 2,2,4 trimethyl pentane, normal heptane and methylcyclopentane. Various mixtures were prepared, carefully controlling the volumetric percentages of the three constituents of the mixture. The monochromator of the apparatus illustrated in the drawing was adjusted so that the infrared light energy emitted from the exit slit 10 constituted a band extending from 7.9 to 8.7 microns. To establish this, pure isooctane was placed in filter cell 22 and pure methyl cyclo pentane was placed in filter cell 21. The sample cell 20 was completely removed from the apparatus. With the monochromator 5 adjusted to provide energy of a spectral band width of about one micron, the infrared energy region extending from 2 to 16 microns was scanned to establish the differential absorption characteristics of the compounds over this spectrum. It was found that the greatest absorption difference occured at 8.3 microns. The narrow spectral band width chosen was therefore the band extending from about 7.9 to 8.7 microns. The sample cell employed was constructed of rock salt plates providing a sample cell with a thickness of 0.1 mm. The filter cells 21 and 22 were similarly constructed of rock salt in such a manner as to have thicknesses of 0.1 mm. Filter cell 21 was filled with 2,2,4 trimethyl pentane at atmospheric pressures while filter cell 22 was left empty. The light intensity control means 14 and 15 were adjusted to a critical position to secure the maximum selectivity of the apparatus to the 2,2,4 trimethyl pentane. In order to determine the proper settings of the energy intensity controls 14 and 15, the selectivity of the apparatus to 2,2,4 trimethyl pentane was established at two positions of the intensity controls 14 and 15. Suitable plots were prepared as illustrated in Figure 2 from which the optimum setting of the trimmers could be determined. It is apparent that the optimum setting of elements 14 and 15 indicated by Figure 2 of the drawings is at about 0.55 units along the abscissa of the plot. At this setting of the light intensity controls, it is to be seen from the drawing that both normal heptane and methylcyclopentane when placed in the sample cell result in the same output signal. It is therefore obvious that the output reading will be affected only by the amount of 2,2,4 trimethyl pentane in the mixture and unaffected by the change in percentage of normal heptane and methylcyclopentane. Consequently, the light intensity controls 14 and 15 were adjusted at this setting for the remainder of the analysis steps.

A series of analytical determinations were made as indicated in the table below. It will be noted that in each of the four analyses conducted, the percentage of 2,2,4 trimethyl pentane was determined quite accurately. It is probable that the errors indicated in the table were due in part, if not entirely, to the difficulties of precisely synthesizing the mixtures analyzed. In any case, it has been established that the analysis procedure of this invention is capable of analyses correct to about 0.1%.

*Analyses for 2,2,4-trimethylpentane in normal heptane-methylcyclopentane mixtures*

RESEARCH DIVISION LIQUID INFRARED ANALYZER

| Synthetic Mixture, Vol. Percent | | 2,2,4-trimethylpentane, Vol. Percent | Found, Vol. Percent 2,2,4-trimethylpentane | Numerical Deviation Vol. Percent |
|---|---|---|---|---|
| Methylcyclopentane | Normal Heptane | | | |
| 0.0 | 80.0 | 20.0 | 20.0 | 0.0 |
| 40.0 | 40.0 | 20.0 | 19.7 | −0.3 |
| 80. | 0.0 | 20.0 | 19.4 | −0.6 |
| 9.1 | 72.7 | 18.2 | 18.2 | 0.0 |

What is claimed is:

1. An arrangement for the determination of a constituent in a mixture comprising in combination: a source of electro-magnetic radiation, radiation splitting means positioned in the range of rays from the said source adapted to divide the radiation into two beams of energy, monochrometer means positioned in the range of rays between the said source and the said light splitting means adapted to provide a narrow selected band width of radiation, and a first radiation transparent body adapted to contain the mixture to be tested also located in the range of rays between the said source and the said lightsplitting means, detectors sensitive to the radiation positioned in the range of rays provided by each of the said two beams, a second radiation transparent body adapted to contain the constituent to be determined positioned in one of the said beams of rays in the range of rays between the said energy splitting means and one of said detectors, and a third body transparent to radiation inserted in the second of the said beams of rays in the range of rays between the said radiation splitting means and the second of the said detectors, and radiation blocking means positioned in each of the beams of radiation between the said radiation splitting means and each of the said detectors adapted to variably control the amount of energy passing the said radiation blocking means, and means for measuring the difference of irradiation of the said detectors.

2. An arrangement for the determination of a constituent in a mixture comprising in combination: a source of electromagnetic radiation, radiation splitting means positioned in the range of rays from the said source adapted to divide the radiation into two beams of energy, monochrometer means positioned in the range of rays between the said source and the said light splitting means adapted to provide a narrow selected band width of radiation and a first radiation transparent body adapted to contain the mixture to be tested also located in the range of rays between the said source and the said lightsplitting means, detectors sensitive to the radiation positioned in the range of rays provided by each of the said two beams, a second radiation transparent body adapted to contain the constituent to be determined positioned in one of the said beams of rays in the range of rays between the said energy splitting means and one of said detectors, and a third body partially opaque to the radiation positioned in the other of the range of rays between the said radiation splitting means and the other of the said detectors.

3. A process for determining a constituent of a mixture comprising the steps of passing undispersed energy through a sample to be analyzed, thereafter dispersing the said energy so as to obtain a narrow band of energy and splitting said narrow band of energy into two beams, passing one of said beams of energy through a sample of the pure constituent to be determined in the mixture, and passing the other of said beams of energy through a partially opaque material, causing each of these beams of energy to impinge on energy intensity detectors and unbalancing the radiation intensities of said beams by partially blocking at least one of the beams so as to permit selective determination of the said constituent, and determining the relative amount of energy reaching each of the detectors.

4. A process for determining a constituent of a mixture comprising the steps of passing a narrow band of radiation energy through a mixture containing a constituent to be determined, thereafter dividing the energy transmitted through the said mixture into two beams, passing one of said beams of energy through a sample of the pure constituent to be determined in the mixture, and passing the other of said beams of energy through a partially opaque material, causing each of these beams of energy to impinge on energy intensity detectors and unbalancing the radiation intensities of said beams by partially blocking at least one of the beams so as to permit selective determination of the said constituent and determining the relative amount of energy reaching each of the detectors.

JOHN J. HEIGL.
JOHN A. HINLICKY.

REFERENCES CITED

The following references are of record in the file of this patent:

UNITED STATES PATENTS

| Number | Name | Date |
| --- | --- | --- |
| 1,695,301 | Schmick | Dec. 11, 1928 |
| 1,758,088 | Schmick | May 13, 1930 |
| 2,170,435 | Sweeney | Aug. 22, 1939 |
| 2,261,498 | Karcher | Nov. 4, 1941 |
| 2,269,674 | Liddel et al | Jan. 13, 1942 |
| 2,443,427 | Kidder et al. | June 15, 1948 |
| 2,462,995 | Ritzmann | Mar. 1, 1949 |